United States Patent [19]
Taylor

[11] Patent Number: 5,238,024
[45] Date of Patent: Aug. 24, 1993

[54] PILOT-OPERATED DIAPHRAGM VALVE WITH SEPARATE ON/OFF CONTROL

[76] Inventor: Jerry L. Taylor, 4538 Sentinel Rock Ter., Larkspur, Colo. 80118

[21] Appl. No.: 815,965

[22] Filed: Jan. 2, 1992

[51] Int. Cl.[5] ............................................. F16K 31/145
[52] U.S. Cl. ........................................ 137/613; 251/46
[58] Field of Search ............... 137/613, 614.19, 878, 137/614.18, 614.2, 614.21, 614.16; 251/30.02, 46

[56] References Cited

U.S. PATENT DOCUMENTS

| | | | |
|---|---|---|---|
| 2,492,873 | 12/1949 | Lamb | 137/614.19 X |
| 2,984,256 | 5/1961 | Wildern | 137/613 |
| 3,433,262 | 3/1969 | Ray | 137/614.19 |
| 3,604,456 | 9/1971 | Jones | 137/613 X |
| 3,967,808 | 7/1976 | Lieding | 251/46 |
| 4,590,967 | 5/1986 | Schmitt | 137/613 |
| 4,685,310 | 8/1987 | Stegmann et al. | 137/614.2 X |

Primary Examiner—Martin P. Schwadron
Assistant Examiner—Kevin L. Lee
Attorney, Agent, or Firm—John E. Reilly

[57] ABSTRACT

A diaphragm valve assembly adapted for use in irrigation systems as a zone valve includes a solenoid-operated diaphragm to control flow through the valve under normal operations, and a ball valve is situated between an inlet port and one or more outlet ports and is selectively movable to a position closing the valve to prevent liquid flow therethrough independently of the opening and closing of the diaphragm so as to permit servicing or repair of the valve without shutting off the entire system.

12 Claims, 2 Drawing Sheets

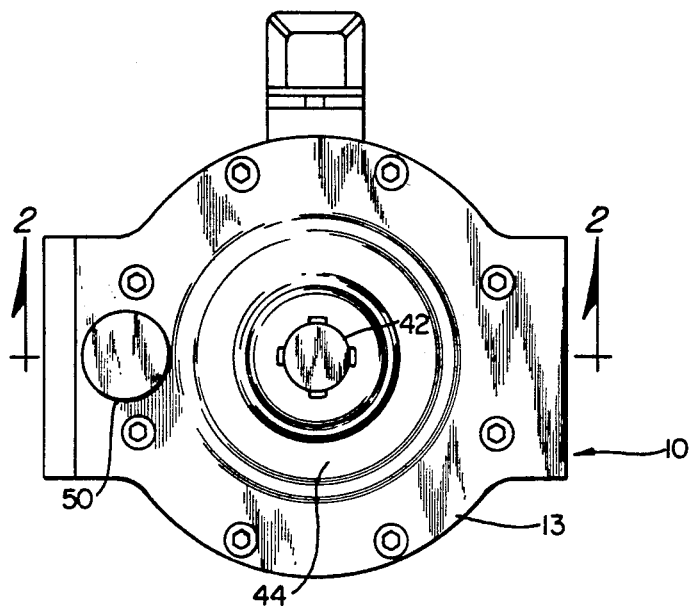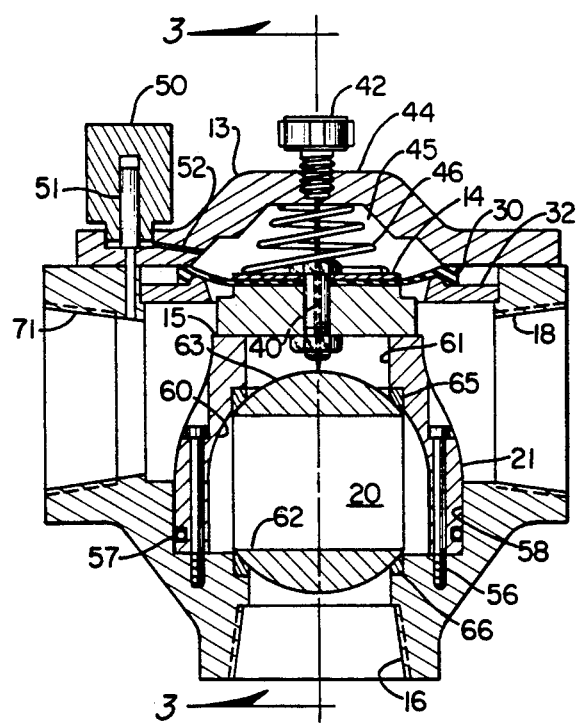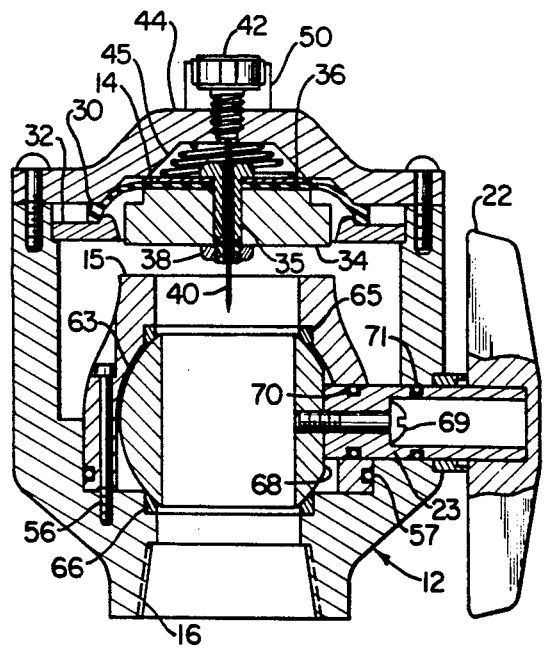

PILOT-OPERATED DIAPHRAGM VALVE WITH SEPARATE ON/OFF CONTROL

This invention relates to liquid control valves; and more particularly relates to a novel and improved pilot-operated diaphragm valve with an on/off control and adapted for use in irrigation systems and other industrial uses.

BACKGROUND AND FIELD OF INVENTION

Pilot-operated diaphragm valves are customarily used as zone valves in irrigation systems and are broadly characterized by having a pilot control which cooperates with the diaphragm to regulate opening and closing of the valve so that if there is line pressure through the inlet the diaphragm is held in a closed position by permitting liquid to fill the diaphragm chamber behind the diaphragm; and, when the solenoid is activated to open the valve, the liquid is drained out of the diaphragm chamber until the pressure in the inlet line exceeds that of the diaphragm and will advance the diaphragm away from its closed position. In the past, when valves of this type have required servicing, it has been necessary to turn off line pressure to all of the valves so that the irrigation operation is totally interrupted until the defective valve can be serviced or repaired and placed back into operation. Not only is this time-consuming but can cause lengthy interruptions in the irrigation cycle and loss of any or all water present in the mainline. Also any dirt or debris washed about by draining the mainline water can be trapped in the valve body causing more problems when the system is recharged.

Representative systems and valves which have been devised in the past are disclosed in various U.S. patents including U.S. Pat. No. 3,967,808 to C. A. Lieding in which a valve can either be manually opened or electrically controlled by a solenoid to open and close but does not independently close either one of its inlets to permit maintenance or servicing of the valve. U.S. Pat. Nos. 3,367,621 and 3,556,464 to D. E. Griswold disclose diaphragm valves which can be modulated to operate between partially open positions but does not permit movement to a fully closed position for servicing of the valve independently of other parts of the system.

It is therefore desirable to be able to selectively close a valve against line pressure to permit servicing of the valve without interrupting the supply of liquid to other parts of the system or to other systems which are operated off of the same water source. Thus, it is important to provide in valves of the type described for a highly simplified means of regulating flow through the valve without affecting the rest of the system so that water flow can be individually controlled or regulated according to the needs of each area being irrigated.

SUMMARY OF INVENTION

It is therefore an object of the present invention to provide for a novel and improved diaphragm valve and particularly of the type used for industrial and irrigation systems.

It is another object of the present invention to provide for a novel and improved zone valve in which flow can be throttled or fully closed to permit servicing of each valve or portions of an irrigation system in a minimum amount of time without shutting off the entire system.

A further object of the present invention is to provide for a novel and improved solenoid-operated diaphragm valve including a simplified manner and means for throttling or opening and closing the valve against line pressure independently of other parts or valves in the system.

It is a still further object of the present invention to provide for a novel and improved diaphragm valve which is simple to construct, highly efficient in operation and easy to control and service.

In accordance with the present invention, a novel and improved diaphragm valve has been devised which comprises a body having a chamber communicating with a liquid inlet under pressure, at least one outlet in communication with the chamber, a diaphragm assembly having a diaphragm mounted in the body including adjustable biasing means to urge the diaphragm to a closed position against line pressure in the inlet, and a ported on/off valve member including control means for advancing the valve member to a position closing the inlet to prevent liquid flow through the valve body independently of the opening and closing of the diaphragm assembly. The diaphragm valve of the present invention is further characterized in that the ported valve member can be employed as a flow control valve as well as on/off valve by adjusting its position with respect to the inlet. Moreover, the valve assembly is so constructed and arranged as to be capable of functioning either as a two-way or three-way valve with one or more outlets in communication with the inlet.

The above and other objects, advantages and features of the present invention will become more readily appreciated and understood from a consideration of the following detailed description of a preferred embodiment of this invention when taken together with the accompanying drawings, in which:

BRIEF DESCRIPTION OF THE DRAWINGS

FIG. 1 is a top plan view of a preferred form of diaphragm valve in accordance with the present invention;

FIG. 2 is a cross-sectional view taken about lines 2—2 of FIG. 1;

FIG. 3 is a cross-sectional view taken about lines 3—3 of FIG. 2;

DETAILED DESCRIPTION OF THE PREFERRED EMBODIMENT

Figure 4:
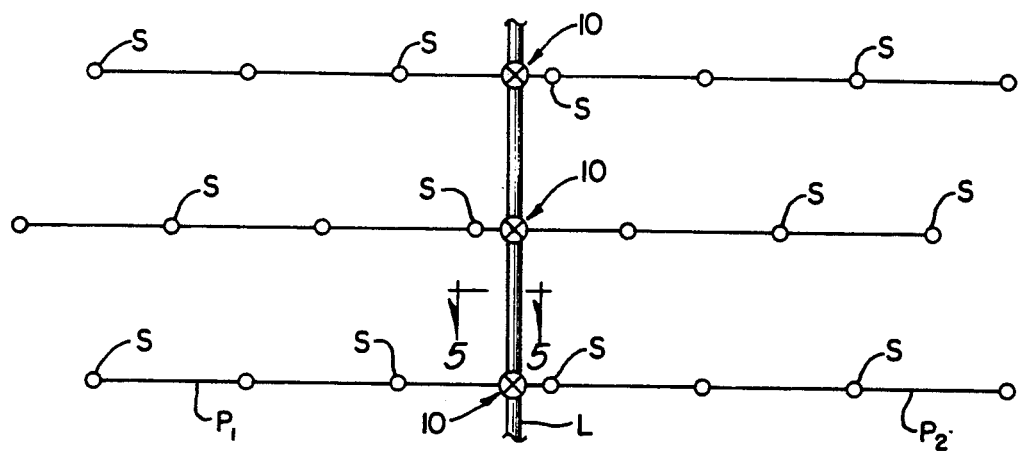
FIG. 4 is a somewhat diagrammatic view illustrating the use of a plurality of diaphragm valves in accordance with the present invention as zone valves in an irrigation system.

Referring in more detail to the drawings, there is illustrated in FIGS. 1 to 3 a preferred form of pilot-operated valve assembly 10 and which is broadly comprised of a valve body 12, upper valve bonnet 13 affixed to the top of the valve body and enclosing a diaphragm assembly 14 in position over an internal valve seat 15. The valve is provided with a lower inlet port 16, diametrically opposed outlet ports 17 and 18, and a ball-shaped ported valve member 20 is interposed between the inlet and outlet ports as illustrated. The valve member 20 is housed internally within a yoke 21 and is movable under the control of a handle 22 and stem member 23 between a closed position as shown in FIG. 2 and open position shown in FIG. 3.

The diaphragm assembly of the valve 10 is merely representative of various well-known pilot-operated valve units, the diaphragm 14 being suitably composed of an elastomeric material and of generally circular configuration with a bead 30 at its outer peripheral edge sandwiched between the valve bonnet 13 and an annular retainer plate 32. A metal disk 34 is affixed to the central portion of the diaphragm by a bolt 35 extending through aligned central openings in a washer 36, the diaphragm 14 and disk 34 and which are tightly assembled together by a nut 38 at the lower end of the bolt 35. The bolt 35 is provided with a central bore to receive a guide pin 40 which projects downwardly from a bleed screw 42 in the crown or raised portion 44 of the bonnet 13 and assists in maintaining the diaphragm in centered relation to the seat 15. In this relation, the raised portion 44 defines an internal chamber 45 above the diaphragm, and a coiled spring element 46 is interposed between the washer 36 and internal wall of the raised portion 44 of the bonnet 13 so as to mount the diaphragm under compression between the valve seat 15 and bonnet 13. A solenoid 50 is positioned at one end of the bonnet 13 and is provided with a plunger 51 to regulate flow through a bleed line 52 between the outlet port 17 and chamber 45. In accordance with conventional practice, the solenoid 50 is activated to permit liquid to be drained out of the chamber 45 through the bleed line 52 until the pressure on the inlet side 16 exceeds the normal closing pressure of the spring element 46 behind the diaphragm. Conversely, to close the diaphragm assembly against line pressure, the solenoid 50 is deactivated to permit the chamber 45 to be refilled until it overcomes the line pressure.

An important feature of the present invention resides in the on/off control valve 20 and its mounting internally of the valve body 12 within the yoke 21. Preferably, the valve seat 15 is of annular configuration at the upper extremity of the yoke 21. The yoke 21 is affixed centrally within the body 12 at the intersection of the inlet port 16 with the outlet ports 17 and 18 by means of elongated threaded fasteners 56, and an annular seal 57 is interposed between the yoke and wall surface of a generally cup-shaped cavity 58 within the valve body. The yoke 21 is of generally cylindrical configuration and slightly enlarged at its base to define a generally spherical internal wall surface 60 which converges upwardly into a cylindrical wall surface 61. In turn, the valve 20 has a central bore 62 extending therethrough and an outer spherical surface 63 complementary to the spherical surface portion 60 of the yoke 21. Annular seals 65 and 66 are disposed in upper and lower spaced relation within the yoke 21 to establish sealed engagement with the spherical portion 63 in the open and closed positions as shown in FIGS. 3 and 2, respectively. The outer spherical surface 63 of the ball valve is interrupted by a flat surface portion 68 to facilitate connection of a stem member 23 by means of a threaded fastener 69, and seals 70 and 71 are interposed between the stem 23 and aligned bores formed in the outer valve body 12 and the base of the yoke 21 for insertion of the stem member 23.

Figure 5:
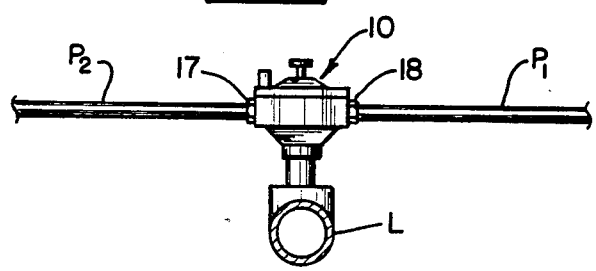
FIG. 5 is a cross-sectional view taken about lines 5—5 of FIG. 4.

The valve 10 of the present invention is so constructed and arranged as to be adaptable for use either as an angle valve or "Tee" valve. For instance, as illustrated in FIGS. 4 and 5, a plurality of valves 10 are mounted at spaced intervals along a main water supply line designated at L in an irrigation system. Each valve 10 has its primary and secondary exhaust ports 17 and 18, respectively, connected into lateral pipes $P_1$ and $P_2$ to supply a series of sprinklers designated at S. In this particular setting, although the valve is shown discharging perpendicular to the flow in the line L, it will be apparent that the valve 10 can also be arranged at different angles or parallel to the line L. When the solenoid is activated to open the valve for flow into the pipes $P_1$ and $P_2$ the discharge flow is equally divided in opposite directions so as to cancel any unilateral surges which would otherwise impose a stress on the valve or accompanying fittings in the system. The smaller lateral pipes and fittings, such as, the pipelines $P_1$ and $P_2$ can be connected directly to the valve thereby eliminating additional lateral Tees and reducing back pressure and friction loss. Again, the valve 10 may be employed as an angle valve by plugging the secondary exhaust port 18. In the event that it is necessary to service any one of the valves 10 or associated lines $P_1$ and $P_2$, the handle 22 is turned to close off flow from the line L into the valve 10 to be serviced. In this way, any necessary servicing or repair can be accomplished while permitting the rest of the system to operate. Thus, it is possible to carry out routine maintenance and repair on the diaphragm and solenoid sections of the valve without having to isolate the valve from main line flow or shut down the system and drain any water out of the main line.

Figure 6:
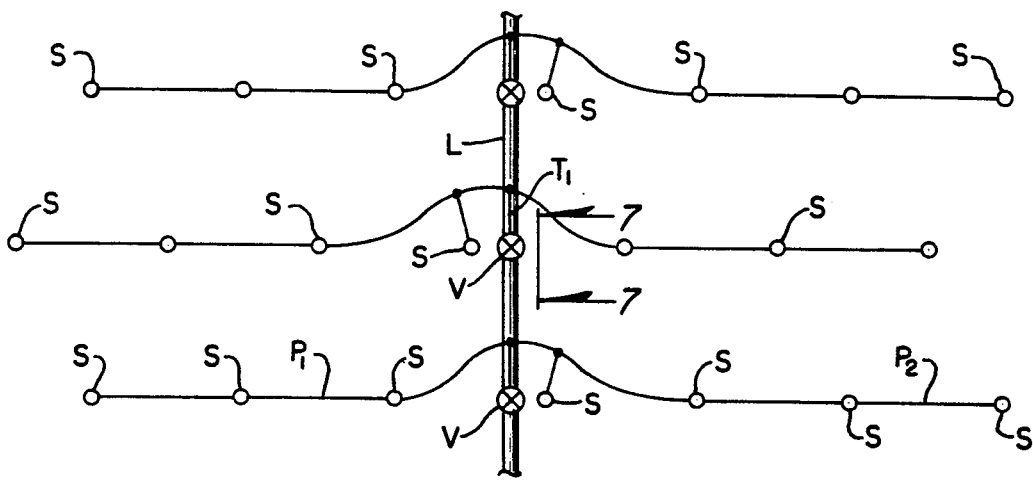
FIG. 6 is a somewhat diagrammatic plan view of a standard or "prior art" irrigation system.
Figure 7:
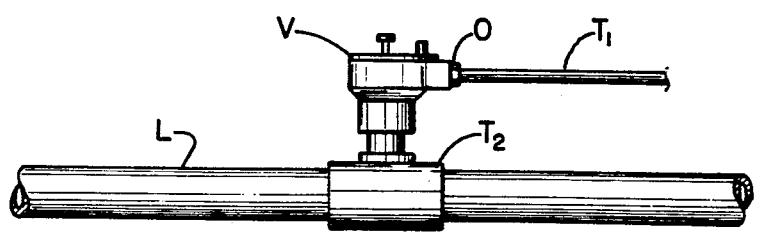
FIG. 7 is a view taken about lines 7—7 of FIG. 6 to illustrate a typical installation of a zone valve in a prior art system.

A standard irrigation system is illustrated in FIGS. 6 and 7 to better emphasize and point out the advantages of the valve 10 when employed as a zone valve in an irrigation system. Like elements of a standard system are correspondingly designated to the designations given in FIGS. 4 and 5 in which each of a series of valves V are connected into a main line L. Specifically, each of the valves V is an angle valve having a single outlet port O connected to a lateral Tee $T_1$ into the pipes $P_1$ and $P_2$. As a result, each valve V can discharge only through one outlet port thereby creating additional back pressure and friction loss on the valve. The surge stress is unilateral creating a fatigue situation in the connection to the main line tee $T_2$. The flow is metered by advancing the diaphragm into the flow path causing additional wear on the diaphragm. Most importantly, however, it is necessary to completely shut down the system and drain any water from the line L and valves V in order to service an individual valve.

It will be evident from the foregoing that the valve of the present invention overcomes a number of problems inherent in irrigation systems as described. Nevertheless, the valve would also have useful application in other commercial and industrial uses. It is therefore to be understood that while a preferred form of diaphragm valve assembly is herein set forth and described, various modifications and changes may be made without departing from the spirit and scope of the present invention as defined by the appended claims and reasonable equivalents thereof.

I claim:

1. A diaphragm valve assembly comprising:
   a body having a chamber communicating with a liquid inlet in said body, said liquid inlet connected to a source of liquid under pressure, at least one outlet extending through said body in communication with said chamber, and an internal valve seat;

a diaphragm assembly having a diaphragm mounted in said body including means yieldingly urging said diaphragm to a closed position with said valve seat along a center line coaxial with a longitudinal axis of said liquid inlet; and a ported ball valve member disposed internally of said body and having surface means including said valve seat, said valve member including control means of advancing said ported ball valve member to a position closing said inlet to prevent liquid flow through said valve body independently of said diaphragm assembly, said control means including a stem member extending through and journaled with respect to said body for connection to said ported ball valve member, and a control handle at an external end of said stem member protruding from said body, said ported ball valve member including a liquid passage therethrough which is movable into alignment with the flow of liquid through said inlet on an axis coincident with the axis of said inlet and said center line of said diaphragm.

2. A diaphragm valve according to claim 1, including a pair of outlets extending away from said body in diametrically opposed relation to one another, said inlet being interposed between said pair of outlets.

3. A diaphragm valve according to claim 1, said control means being operative to rotate said ported valve member to a closed position in which said liquid passage is disposed at right angles to the direction of liquid flow through said inlet.

4. A diaphragm valve according to claim 1, said diaphragm assembly including a bleed screw and a guide member to center said diaphragm with respect to said valve seat.

5. A diaphragm valve according to claim 1, said diaphragm assembly including a diaphragm chamber on one side of said diaphragm opposite to said inlet, a bleed line extending between said diaphragm chamber and said outlet, and a plunger movable between a position closing said bleed line to retain liquid in said diaphragm chamber and resist opening of said diaphragm against liquid inlet pressure and an open position in which liquid is drained out of said diaphragm chamber into said outlet until said inlet pressure exceeds that in said diaphragm chamber.

6. A diaphragm valve according to claim 1, said control means movable to advance said ported valve member to intermediate positions between the open and closed positions to adjust the flow rate of liquid through said inlet.

7. In an irrigation system wherein a water supply line is provided to supply water under pressure through a series of sprinkler lines, and a plurality of zone valves are provided with each said zone valve interconnecting said supply line to one of said sprinkler lines, each said zone valve comprising:

a valve body having a chamber therein communicating with a liquid inlet communicating with said supply line and at least one exhaust port communicating with said sprinkler line, said liquid inlet connected to a source of liquid under pressure, said exhaust port(s) in communication with said chamber, and an internal valve seat;

a diaphragm assembly having a diaphragm mounted in said body including means yieldingly urging said diaphragm to a closed position with said valve seat along a center line coaxial with a longitudinal axis of said liquid inlet; and a ported ball valve member disposed internally of said body and having surface means including said valve seat, said valve member including control means for advancing said ported ball valve member to a position closing said inlet to prevent liquid flow through said valve body independently of said diaphragm assembly, said body including a yoke provided with internal spherical wall portions, said ported ball valve member being of generally spherical configuration to include complementary spherical wall portions to those of said yoke, said control means including a stem member extending through and journaled with respect to said body for connection to said ported ball valve member, and a control handle at an external end of said stem member protruding from said body, said ported ball valve member including a liquid passage therethrough which is movable into alignment with the flow of liquid through said inlet on an axis coincident with the axis of said inlet and said center line of said diaphragm.

8. A diaphragm valve according to claim 7, including a pair of exhaust ports extending through said body in diametrically opposed relation to one another, said inlet communicating with said exhaust port, and said valve member disposed between said inlet and said valve seat.

9. A diaphragm valve according to claim 8, said advancing means including a stem member extending through and journaled with respect to said body for connection to said ball valve member, and rotating means on said stem for rotating said ball valve member between open and closed positions.

10. A diaphragm valve according to claim 7, said diaphragm assembly including a bleed screw, a guide member to center said diaphragm, and a metal disk mounted in said diaphragm to engage said seat.

11. A diaphragm valve according to claim 7, said diaphragm assembly including a diaphragm chamber on one side of said diaphragm opposite to said inlet, a bleed port extending between said diaphragm chamber and said outlet, and a plunger movable between a position closing said bleed line to retain liquid in said diaphragm chamber and resist opening of said diaphragm against liquid inlet pressure and an open position in which liquid is drained out of said diaphragm chamber into said exhaust port until said liquid inlet pressure exceeds that in said diaphragm chamber.

12. A diaphragm valve according to claim 11, including a solenoid associated with said plunger to control opening and closing of said bleed line.

* * * * *